United States Patent [19]
Matsuoka et al.

[11] Patent Number: 5,997,455
[45] Date of Patent: Dec. 7, 1999

[54] TOOL CLAMP MECHANISM WITH SHORTENED SPINDLE

[75] Inventors: Nobuyuki Matsuoka, Ichinomiya; Ken Nagashima; Narihiko Hashimoto, both of Nagoya, all of Japan

[73] Assignee: Brother Kogyo Kabushiki Kaisha, Nagoya, Japan

[21] Appl. No.: 09/119,582

[22] Filed: Jul. 21, 1998

[30] Foreign Application Priority Data

Jul. 23, 1997 [JP] Japan ..................................... 9-197328
Jul. 29, 1997 [JP] Japan ..................................... 9-203164

[51] Int. Cl.⁶ .............................. B23Q 3/157; B23C 5/26
[52] U.S. Cl. ............................................. 483/56; 409/233
[58] Field of Search ........................ 279/75; 408/239 R; 483/44, 45, 55, 56; 409/231, 232, 233, 234

[56] References Cited

U.S. PATENT DOCUMENTS

| | | | |
|---|---|---|---|
| 2,476,781 | 7/1949 | Tomlinson | 279/4.08 |
| 2,565,330 | 8/1951 | Sundt | 279/4.08 |
| 4,172,683 | 10/1979 | Shimajiri et al. | 409/233 |
| 4,398,326 | 8/1983 | Joerger | 279/4.07 |
| 4,583,892 | 4/1986 | Armbruckner | 409/231 |
| 4,704,056 | 11/1987 | Babel | 408/240 |
| 4,745,673 | 5/1988 | Araki et al. | 409/233 |
| 4,750,850 | 6/1988 | Husted | 409/233 |
| 4,817,267 | 4/1989 | Hitomi | 483/44 |
| 4,873,756 | 10/1989 | Yamane et al. | . |
| 5,070,592 | 12/1991 | Sugata | 409/233 |
| 5,129,140 | 7/1992 | Yan et al. | 483/45 |
| 5,487,628 | 1/1996 | Suzuki | 409/231 |
| 5,816,987 | 10/1998 | Yan et al. | 483/49 |

FOREIGN PATENT DOCUMENTS

| | | | |
|---|---|---|---|
| 58-186543 | 10/1983 | Japan | 483/45 |
| 63-52946 | 3/1988 | Japan | 409/233 |
| U-5-24426 | 3/1993 | Japan | . |
| 755455 | 8/1980 | U.S.S.R. | 409/233 |

*Primary Examiner*—Daniel W. Howell
*Attorney, Agent, or Firm*—Oliff & Berridge, PLC

[57] ABSTRACT

A tool clamp mechanism includes a hollow spindle in which a tool can be inserted, the spindle having at least one slot which is axially elongated, a draw bar movably provided in the spindle, and a spindle head which rotatably supports the spindle. A drive ring is provided around the spindle. The drive ring and the draw bar are connected by a connecting pin which penetrates the drive ring and the draw bar through the slot of the spindle. A pusher lever is provided to the spindle head, which urges the drive ring so that the draw bar releases the tool. The drive ring has a contact surface which the pusher lever abuts. The contact surface is positioned ahead of the connecting pin in a pushing direction of the pusher lever.

20 Claims, 14 Drawing Sheets

TOOL CLAMP MECHANISM WITH SHORTENED SPINDLE

BACKGROUND OF THE INVENTION

This invention relates to a tool clamp mechanism used in a machine tool.

FIG. 1 shows a machine tool employing a conventional tool clamp mechanism disclosed in Japanese Utility Model No. HEI 5-24426. The clamp mechanism includes a hollow spindle 225 which receives a tool 260 at one axial end thereof. The spindle 225 is vertically supported by a spindle head 220. The spindle 225 is rotated by a rotation motor 256 provided to the spindle head 220. The upper end of the spindle 225 is connected to the rotation motor 256 via a coupling 254. A draw bar 265 is slidably provided in the spindle 225. The draw bar 265 is so constituted as to catch the tool 260 when the draw bar 265 is at its upper position, while the draw bar 265 releases the tool 260 when the draw bar 265 is at its lower position.

FIG. 2 is an enlarged view showing a main part of the machine tool of FIG. 1. In order to move the draw bar 265, a swing lever 230 is provided to the spindle head 220. A pin 270 is provided at the top of the draw bar 265, which projects outward through a slot 276 formed on the spindle 225. The swing lever 230 abuts the pin 270 from above. Further, a spring 278 is provided in the spindle 225 for biasing the draw bar 256 upward. With such an arrangement, when the swing lever 230 swings clockwise, the swing lever 230 urges the pin 270 downward. With this, the draw bar 265 is moved downward, so as to release the tool 260. When the swing lever 230 swings counterclockwise, the swing lever 230 releases the pin 270. With this, the draw bar 265 is moved upward (due to the force of the spring 278), so as to catch the tool 260.

In order to miniaturize the machine tool and to reduce the manufacturing cost thereof, it is desired to shorten the whole length of the spindle 225. However, since the swing lever 230 is located above the pin 270, it is necessary to provide a space for the swing lever 230 above the slot 265. Thus, with consideration of limits in shortening the spring 278 and the slot 276, it is difficult to shorten the whole length of the spindle 225. Accordingly, there is a strong demand for a clamp mechanism which enables the shortening of spindle.

Further, the swing lever 230 is generally actuated by a cam member 223 (FIG. 1) located outside the spindle head 220. Thus, one end of the swing lever 230 projects outward from the spindle head 220 through an opening 272 formed on a housing of the spindle head 220. The opening 272 must be large enough to allow the swinging motion of the swing lever 230. With this, cutting chips or cutting oil may enter into the spindle head 220 through the opening 272, which may cause a damage of the spindle 225.

Therefore, there is a strong demand for a clamp mechanism in which the invasion of cutting chips or cutting oil can be prevented.

SUMMARY OF THE INVENTION

It is therefore an object of the present invention to provide a tool clamp mechanism enabling the shortening of a spindle of a machine tool. Further, it is another object of the present invention to prevent the invasion of cutting chips or cutting oil in a spindle head.

According to an aspect of the present invention, there is provided a tool clamp mechanism including a hollow spindle having at least one slot which is axially elongated, a draw bar provided in the spindle and axially movable in first and second directions thereby to release and catch the tool, a biasing member (provided in the spindle) which biases the draw bar in the second direction, a spindle head which rotatably supports the spindle, a drive ring provided around the spindle, a pusher lever provided to the spindle head for urging the drive ring in the first direction, and a connecting pin which connects the draw bar and the drive ring. The connecting pin penetrates the drive ring and the draw bar through the slot. The drive ring has a contact surface which the pusher lever abuts. The contact surface is positioned ahead of the connecting pin in the first direction.

As constructed above, when the pusher lever urges the drive ring, the draw bar moves in the first direction and releases the tool. When the pusher lever does not urge the drive ring, the draw bar is moved in the second direction (due to the force of the biasing member) and catches the tool.

If such a clamp mechanism is applied to a machine tool as shown in FIG. 1, it is not necessary to provide a space for the pusher lever above the slot. Thus, the whole length of the spindle can be shortened. Accordingly, it is possible to miniaturize the machine tool and to reduce the manufacturing cost thereof.

In a particular arrangement, the drive ring includes a first flange on which the contact surface is formed, a second flange which the connecting pin penetrates, and a cylinder portion between the first and second flanges. Since the contact surface is formed on the first flange, the pusher lever is able to push the drive ring irrespective of the rotational position of the drive ring. In one preferred embodiment, the pusher lever includes a fork portion and two contact elements which are provided to the fork portion and which urge the surface of the flange.

Preferably, the second flange has two cutaway portions which are parallel with each other. The distance between the two cutaway portions is smaller than the distance between the two contact elements. With this, the contact elements do not interfere with the drive ring when the drive ring is pulled out from the spindle head.

Conveniently, the second flange has at least one through-hole through which the connecting pin is inserted. The through-hole is formed on a thick-walled portion of the second flange. Since the through-hole is formed on a thick-walled portion of the second flange, a relatively large force can be applied to the connecting pin. Preferably, the contact element comprises a roller.

In a particular case, the connecting pin penetrates one axial end of the drive ring, while the contact surface is formed at the other axial end of the drive ring.

According to another aspect of the invention, there is provided a tool clamp mechanism including a hollow spindle in which a tool can be inserted, a draw bar provided in the spindle and axially movable in first and second directions thereby to release the tool and to catch the tool, a spindle head which rotatably supports the spindle and has a housing, and a pusher mechanism which pushes the draw bar in the first direction so that the draw bar releases the tool. The pusher mechanism includes a pusher lever accommodated in the housing of the spindle head, and a slidable member provided to the spindle head. A part of the slidable member is connected to the pusher lever. The slidable member projects from the housing and is slidable inward and outward of the housing, so that the slidable member is engagable with a drive member provided outside of the spindle housing.

As constructed above, since the spindle head has no opening for allowing the pusher lever to project outward, the invasion of cutting chips or cutting oil can be prevented.

In a particular arrangement, the slidable member comprises a rod. The rod is slidably supported in a through-hole provided to the housing. With this, the invasion of cutting chips or cutting oil can be prevented in a simple structure.

In one preferred embodiment, the drive member includes a cam provided to a stationary part of the machine tool. The slidable member engages the cam according to a movement of the spindle head. Such an arrangement is advantageous particularly when applied to a machine tool having a movable spindle head.

In another preferred embodiment, the drive member includes an actuator (for example, a fluid cylinder) provided to the outer surface of the housing. Such an arrangement is advantageous particularly when applied to a machine tool wherein a spindle head is not movable.

DESCRIPTION OF THE PREFERRED EMBODIMENT

The first embodiment of the present invention is described with reference to FIGS. 3 through 10.

Figure 3:
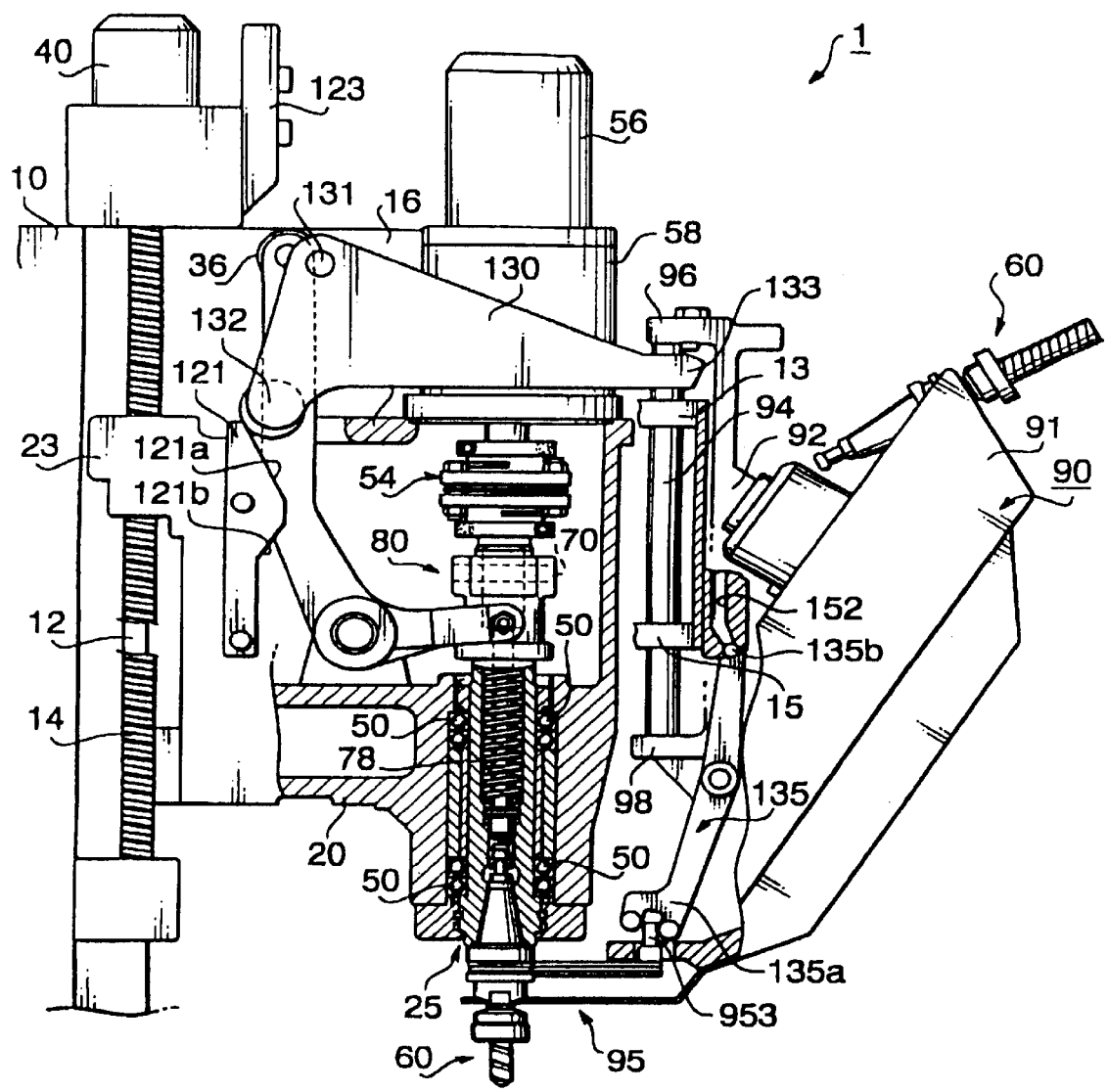
FIG. 3 is a side view of a machine tool using a clamp mechanism according to a first embodiment.

FIG. 3 is a side view of a machine tool 1 employing a clamp mechanism of the first embodiment. The machine tool 1 includes a magazine 90 accommodating a plurality of tools 60, a spindle 25 for holding one of the tools 60 and a spindle head 20 for supporting the spindle 25.

Figure 1:
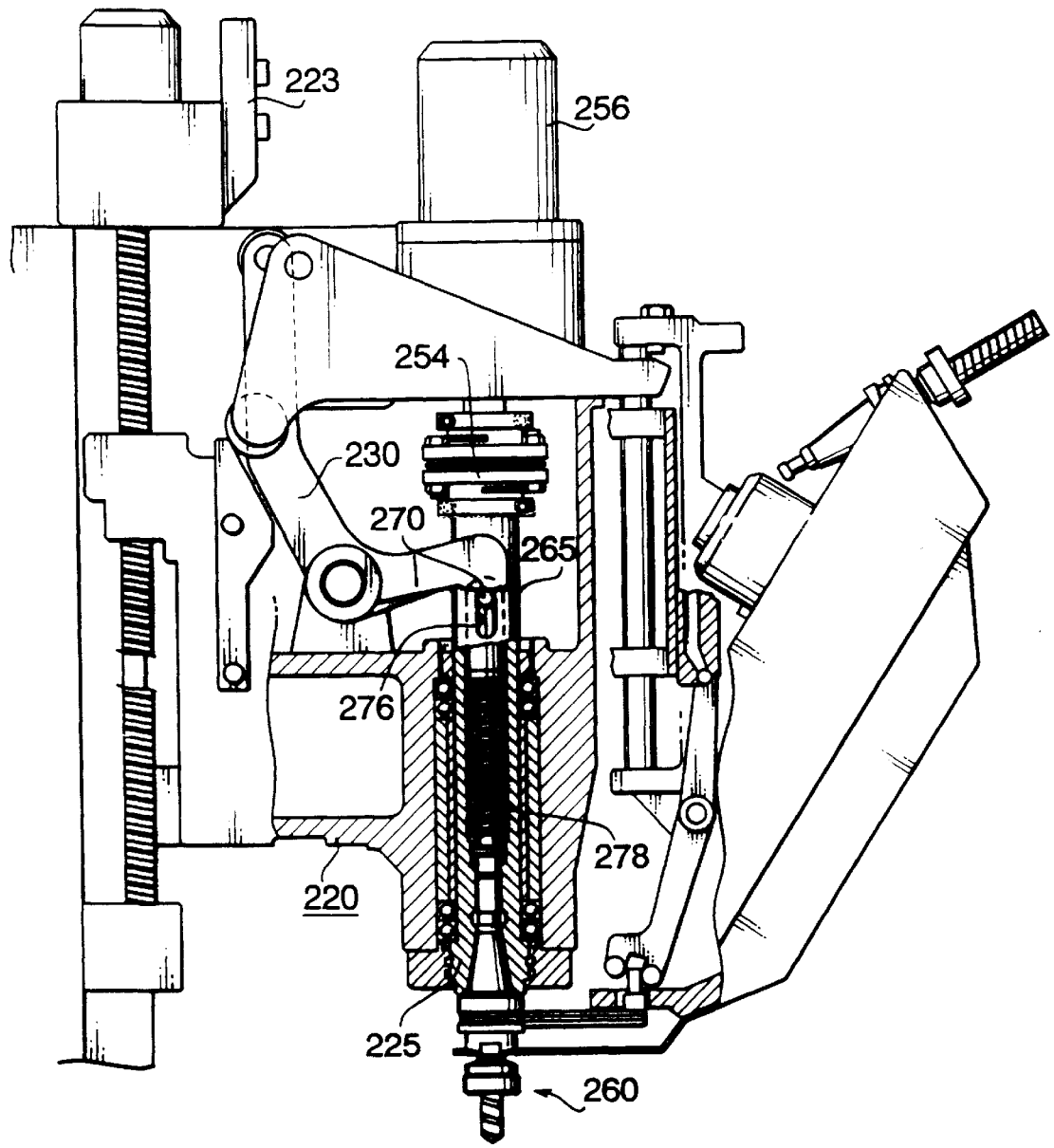
FIG. 1 is a side view of a machine tool using a conventional clamp mechanism.
Figure 2:
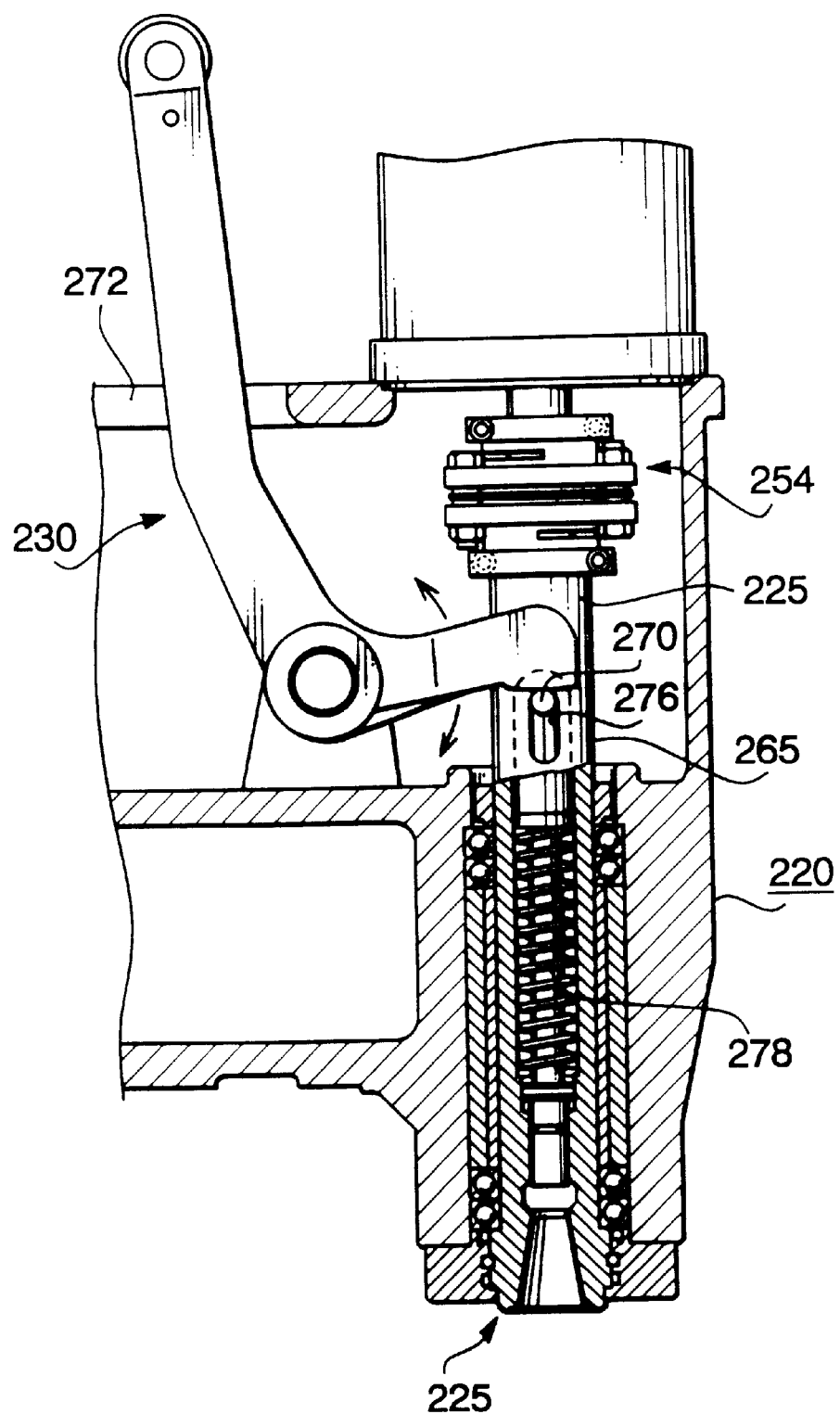
FIG. 2 is an enlarged view of the machine tool of FIG. 1.

The machine tool 1 includes a not shown base and a vertically extending column 10 planted on the base. A frame 16 is provided to the side (the right side in FIG. 1) of the column 10. The frame 16 supports the magazine 90 and the spindle head 20.

A pair of guide rails 12 (one of the guide rails 12 are not shown) are provided to the column 10. The spindle head 20 is driven by a ball screw mechanism including a screw 14 and a nut 23 formed on the spindle head 20 and engaging the screw 12. The screw 12 is driven by a elevation motor 40 provided at the top of the column 16, so as to move the screw head 20 vertically.

The spindle 25 is made of a hollow shaft. The spindle 25 is vertically supported by the spindle head 20 via bearings 50 so that the spindle 25 is rotatable about an axis thereof. In order to rotate the spindle 25, a rotation motor 56 and a reducer 58 are provided at the top of the spindle head 20. The upper end of the spindle 25 is connected to a reduction gear unit 58 via a coupling 54.

Figure 4:
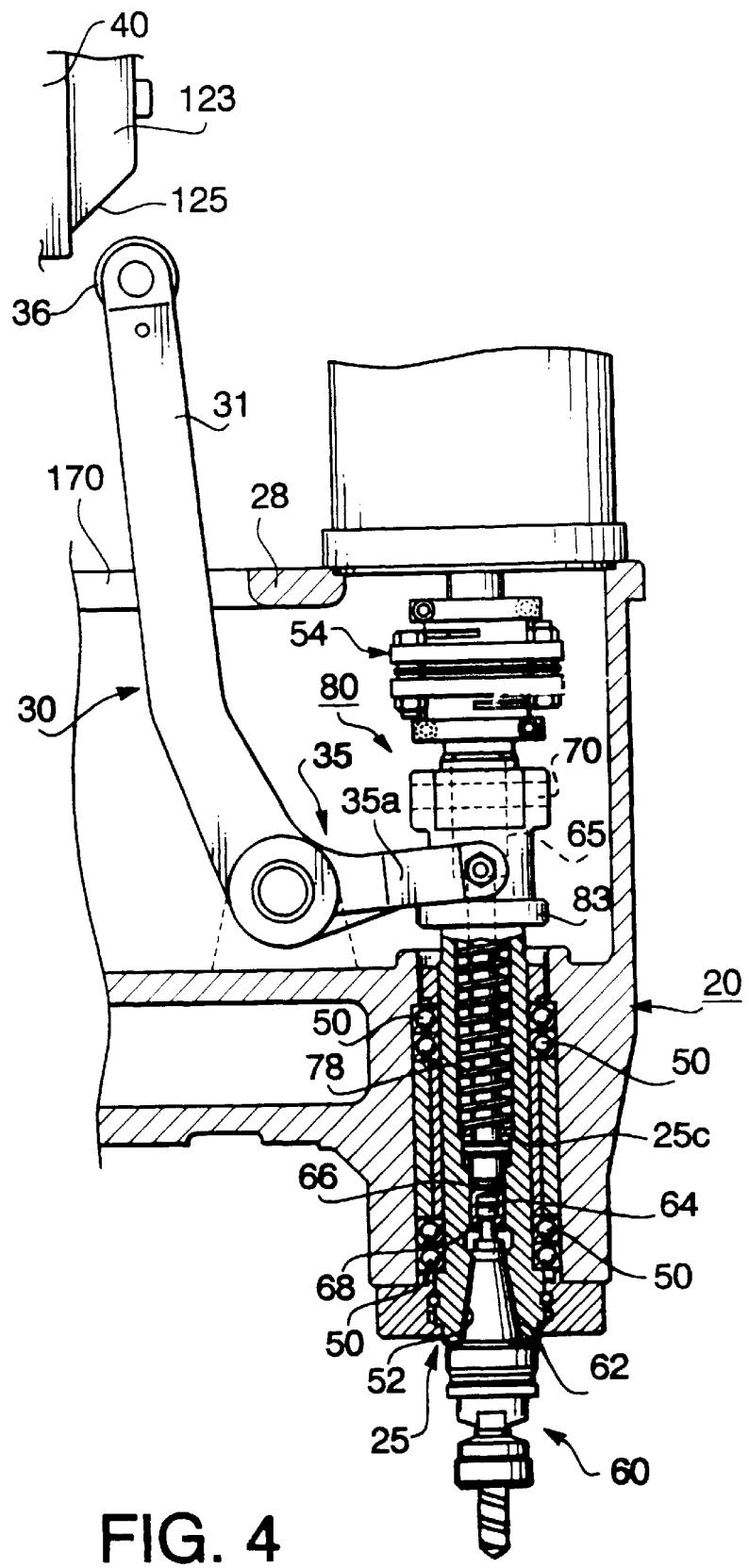
FIGS. 4 and 5 are an enlarged side views of the main part of the machine tool of FIG. 3.
Figure 5:
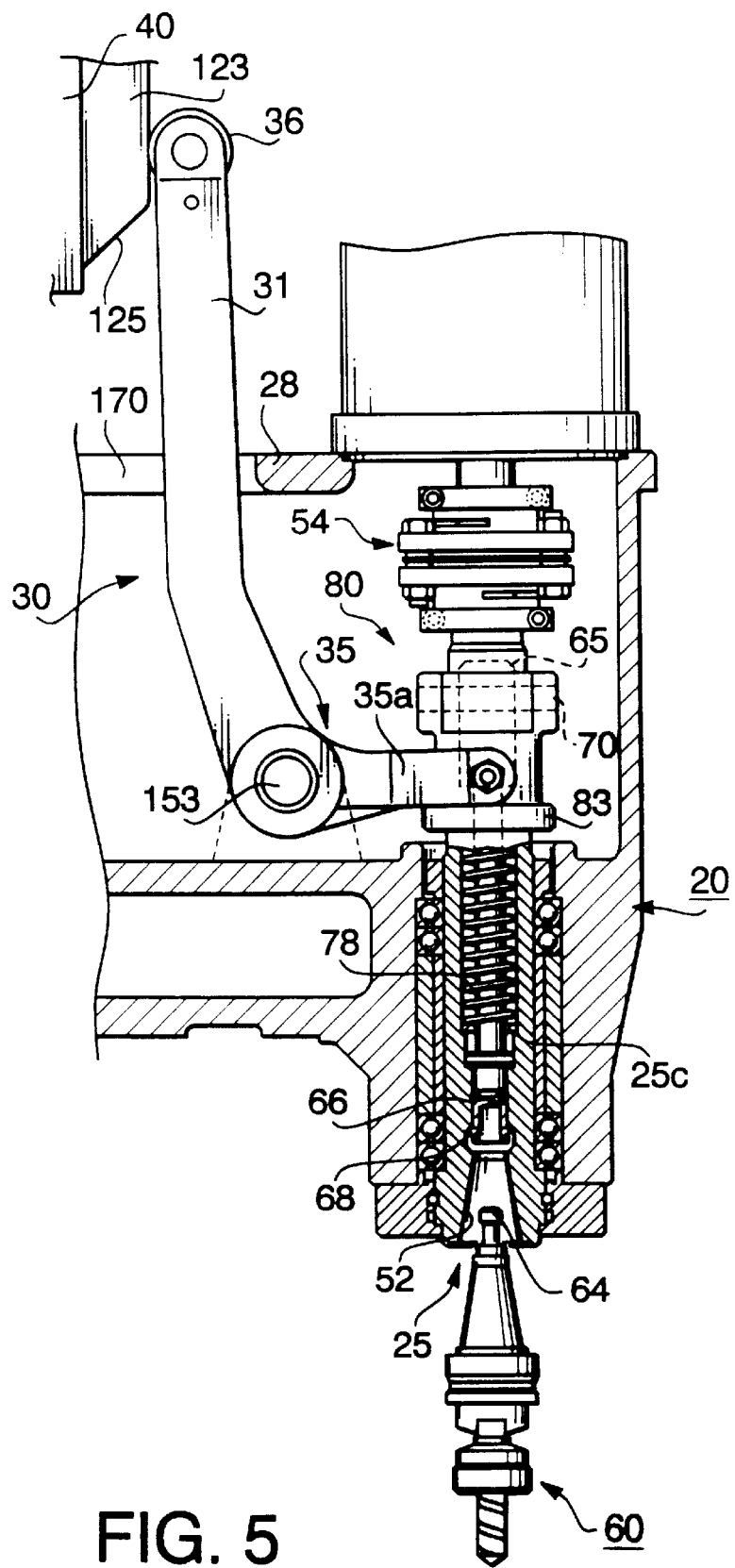

FIGS. 4 and 5 are sides views showing a main part of the machine tool 1. In order to clamp the tool 60, the draw bar 65 is inserted in a hollow portion of the spindle 25. The draw bar 65 is vertically slidable in the spindle 25. Further, the draw bar 65 is urged upward by a spring 78 provided in the spindle 25. The lower end of the draw bar 65 is provided with a catching recess. The draw bar 65 is arranged to catch the tool 60 when the draw bar 65 is at the upper position, and to release the tool 60 when the draw bar 65 is at the lower position (detailed below).

Figure 7:
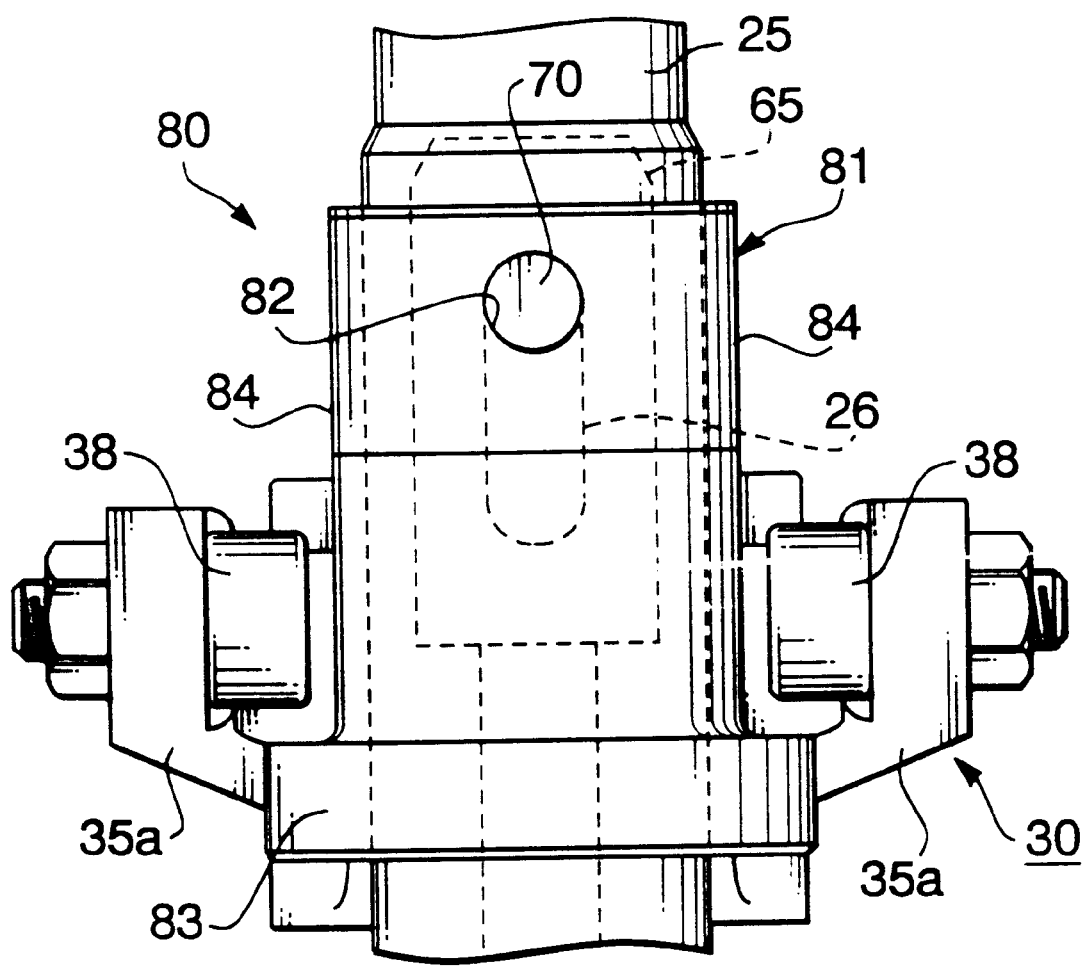
FIG. 7 is a perspective view of the drive ring of FIG. 6.

In order to move the draw bar 65, a pusher lever 30 is provided to the spindle head 20. The pusher lever 30 is L-shaped and includes a long arm 31 and a short arms 35. Further, the pusher lever 30 is pivoted at an intersection of the arms 31 and 35. The short arm 35 is fork-shaped and includes two prongs 35a each of which supports a contact roller 38 (FIG. 7). The long arm 31 extends and projects upward from the spindle head 20. The long arm 31 has a cam follower 36 at the top end thereof. A cam plate 123 is provided to a casing of the elevation motor 40, so that the cam plate 123 is located above the swing arm 30. When the spindle head 20 moves upward, the cam follower 36 of the long arm 31 contacts an inclined cam surface 125 of the cam member 123. With this, the pusher lever 30 swings clockwise by a certain degree, thereby to push a drive ring 80 (detailed below) downward as shown in FIG. 5.

Figure 6:
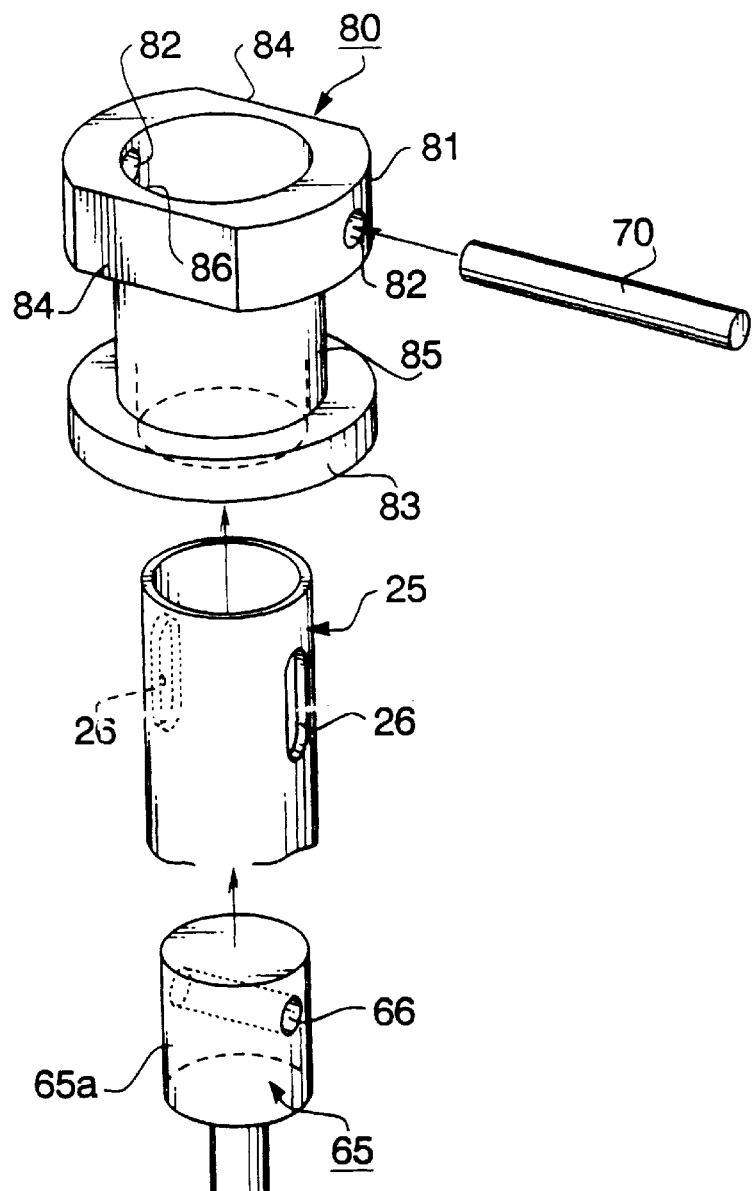
FIG. 6 is a front view of a drive ring.

FIGS. 6 and 7 are an exploded perspective view and a side view illustrating the drive ring 80, the spindle 25 and the draw bar 65. As shown in FIG. 6, the drive ring 80 includes upper and lower flanges 81 and 83 and a cylinder portion 85 between the flanges 81 and 83. The upper flanges 81 have two straight cutaway-portions 84. The cutaway-portions 84 are parallel to each other, a distance thereof being equal to an outer diameter of the cylinder portion 85. As shown in FIG. 7, the interval between two contact rollers 38 of the pusher lever 30 is larger than the diameter of the cylinder portion 85 and is smaller than the diameter of the lower flange 83. That is, the contact rollers 38 are able to abut the upper surface of the lower flange 83. Further, the contact rollers 38 do not interfere with the drive ring 80 when the drive ring 80 is pulled out from the spindle head 20.

The top portions of the spindle 25 and the draw bar 65 are inserted in a main hole 86 of the drive ring 80, in such a manner that the spindle 25, the draw bar 65 and the drive ring 80 are substantially coaxial with each other. The drive ring 80 and the draw bar 65 are connected with each other by means of a connecting pin 70. The connecting pin 70 penetrates the drive ring 80, the spindle 25 and the draw bar 65 in a direction perpendicular to the center axis of the spindle 25. For this purpose, a pair of through-holes 82 are formed on thicker-wall portions of the upper flange 81, the through-holes 82 being aligned with each other. Further, a pair of slots 26 are formed on opposing peripheral walls of the spindle 25. Furthermore, a through-hole 66 is formed on a large diameter portion 65a of the draw bar 65, which extends across the draw bar 65. With this, the connecting pin 70 is inserted through the through-holes 82 of the drive ring 80, the slots 26 of the spindle 25 and the through-hole 66 of the draw bar 65. The slots 26 are vertically elongated, which allows the connecting pin 70 to vertically move in the slots 26. With this, the drive ring 80 and the draw bar 65 are connected to each other. Further, the drive ring 80 and the draw bar 65 are vertically movable with respect to the spindle 25. The spring 78 is provided in the hollow portion of the spindle 25 so that the spring 78 abuts the bottom surface of the large diameter portion 65a of the draw bar 65. The lower end (not shown) of the spring 78 is supported by a shoulder portion 25c. With this, the spring 78 biases the draw bar 65 upward.

Figure 8A:
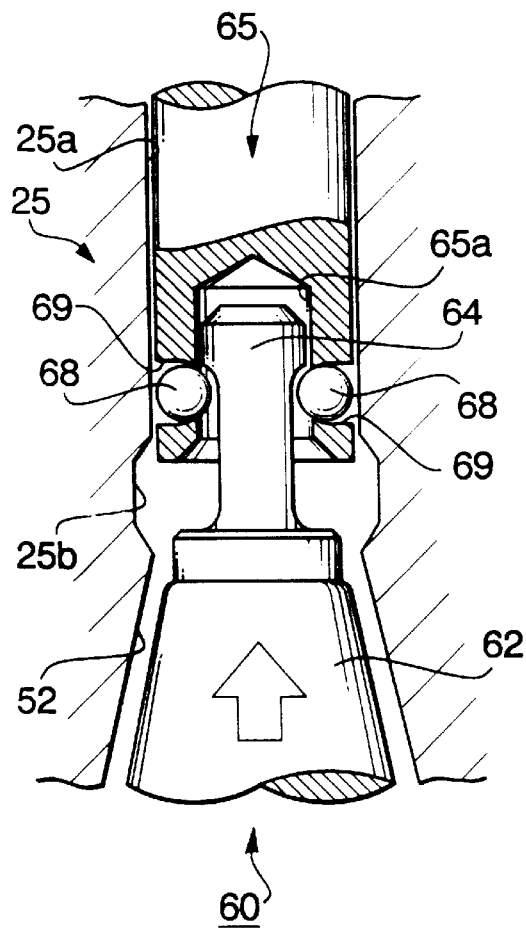
FIGS. 8A and 8B are schematic view showing a clamping part of a spindle.
Figure 8B:
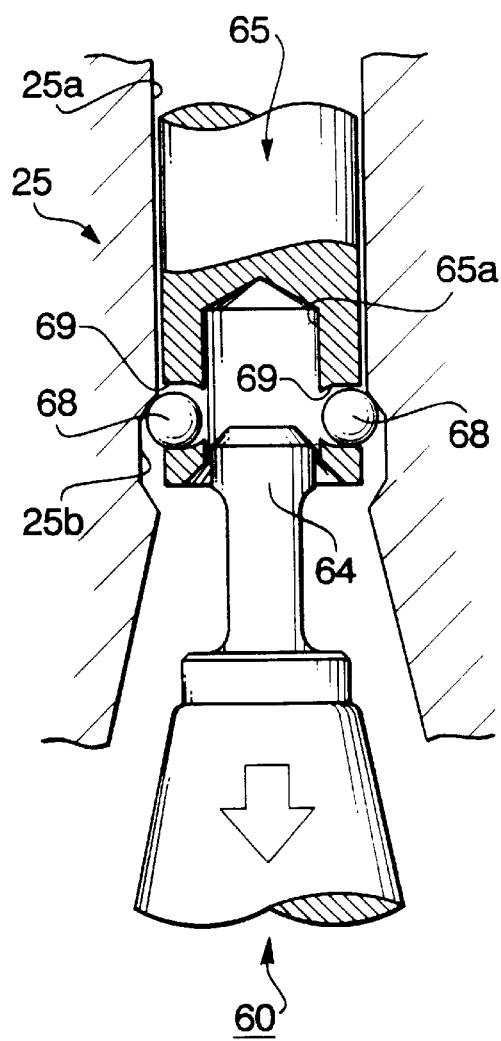

FIGS. 8A and 8B are a schematic view showing an arrangement for clamping the tool 60. The tool 60 has a tapered arbor 62 and a stud 64 provided to the tip of the arbor 62. The spindle 25 has a conical hole 52 formed at the bottom end thereof, for receiving the tapered arbor 62 of the tool 60. The center hole 25a of the spindle 25 has a large diameter portion 25b located above the conical hole 52. The draw bar 65 has a recess 65a at the bottom end thereof. Further, a plurality of ball-receive-holes 69 are formed on a periphery around the recess 65a, for supporting a plurality of balls 68 therein. The ball-receive-holes 69 are so shaped that the balls 68 supported therein are not dropped in the recess 65a. When the draw bar 65 is in its upper position, the balls 68 are urged inward by an inner wall of the center hole 25a as shown in FIG. 8A. In this state, the stud 64 of the tool 60 is held by balls 68. Thus, the tool 60 is securely caught by the draw bar 65. Conversely, when the draw bar 65 is its lower position, the balls 68 are positioned in the large diameter portion 25b. In this state, the balls 68 are able to move outward as shown in FIG. 8B. Thus, the tool 60 is released by the draw bar 65. With such an arrangement, the tool 65 is caught and released according to the vertical movement of the draw bar 65 (with respect to the spindle head 20).

The structure of the magazine 90 is described with reference to FIG. 3. The magazine 90 includes a magazine frame 92 slidably supported by the frame 16. The magazine frame 92 has a vertically extending slide rail 94. Top and bottom ends of the slide rail 94 are fixed to upper and lower brackets 96 and 98 of the magazine frame 92. Further, the slide rail 94 is slidably supported by a pair of support plates 13 and 15 provided to a wall of the frame 16. With this, the magazine frame 92 (and therefore the magazine 90) is vertically movable with respect to the frame 16.

The magazine 90 has a bevel wheel 91 and a plurality of tool holders 95 circumferentially arranged on the bevel wheel 91. The magazine 90 is rotated by a not shown magazine rotation mechanism, so that the tools 60 (held by the respective tool holders 95) are sequentially positioned beneath the spindle 25 one by one.

A bell crank 130 is provided for elevating the magazine 90. The bell crank 130 is pivoted by a pivoting shaft 131 fixed to the frame 16. The bell crank 130 has a cam follower 132 engaging a cam 121 provided to the spindle head 20. The cam 121 has first and second slopes 121a and 121b. Further, the bell crank 130 has an abutting portion 133 which abuts the upper bracket 96 of the magazine frame 92 from below. When the cam follower 132 contacts the first slope 121a of the cam 121, the bell crank 130 swings counterclockwise, so as to move the magazine 90 upward. When cam follower 132 contacts the second slope 121b of the cam 121, the bell crank 130 swings clockwise, so as to move the magazine 90 downward. Thus, the magazine 90 is vertically moved according to the vertical movement of the spindle head 20.

Figure 9:
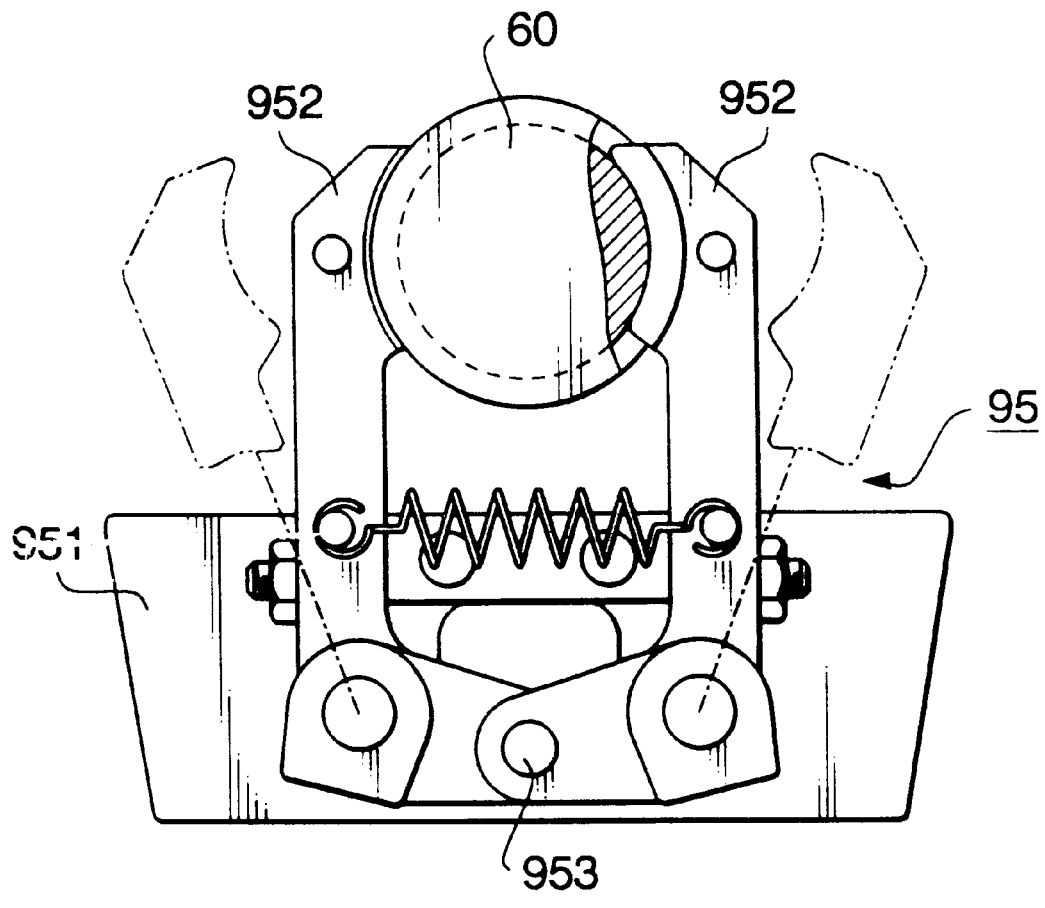
FIG. 9 is a bottom view of the tool holder.

The structure of the tool holder 95 is now described. FIG. 9 is a bottom view of the tool holder 95. The tool holder 95 includes a plate member 951 and two claws 952 pivotably supported on the plate member 951. Each claw 952 is L-shaped and includes long and short arms. The short arms of the claws 952 are connected by a pin 953. The long arms of the claws 952 are arranged to sandwich the tool 60. By moving the pin 953 away from the tool 60 (as shown by an arrow Y in FIG. 9), the claws 952 catch the tool 60. By moving the pin 953 toward the tool 60 (as shown by an arrow X in FIG. 9), the claws 952 release the tool 60.

As shown in FIG. 3, in order to move the pin 953 of the tool holder 95, a swing arm 135 is swingably mounted to the magazine frame 92. The swing arm hook 135 has a hook 135a formed at the bottom end thereof, which engages the pin 953 from above. The arm 135 further has a cam follower 153b at the upper end thereof, which engages a cam groove 152 provided to the machine frame 16. Due to the engagement of the groove 152 and the cam follower 135b, when the spindle head 20 vertically moves, the swing arm 135 swings so as to actuate the pin 953 of the tool holder 95. With this, the claws 952 are actuated according to the vertical movement of the magazine 90.

The operation of the machine tool 1 is described with reference to FIG. 3. On releasing the tool 60, a controller (not shown) of the machine tool 1 drives the elevation motor 40 to move the spindle head 20 upward. When the spindle head 20 moves upward, the cam follower 36 of the pusher lever 30 abuts the cam plate 123, so that the pusher arm 30 swings clockwise by a certain amount. With this, the contact rollers 38 (FIG. 7) of the pusher arm 30 push the drive ring 80 downward. Thus, the drive ring 80 and the draw bar 65 move downward (with respect to the spindle 25).

During this upward movement of the spindle head 20, the magazine 90 moves upward and then downward. First, the cam follower 132 contacts the first slope 121a of the cam 121, so that the bell crank 130 swings counterclockwise. With this, the abutting portion 133 of the bell crank 130 urges the upper bracket 96 upward. Thus, the magazine 90 moves upward, along with the spindle head 20. Further, since the magazine 90 moves upward, the swing arm 135 swings so that the tool holder 95 holds the tool 60.

When the cam follower 132 of the bell crank 130 reaches the end of the first slope 121a, the cam follower 36 of the pusher lever 30 also reaches the end of the inclined surface 125 of the cam plate 123. In this state, the draw bar 65 releases the tool 60.

Figure 10:
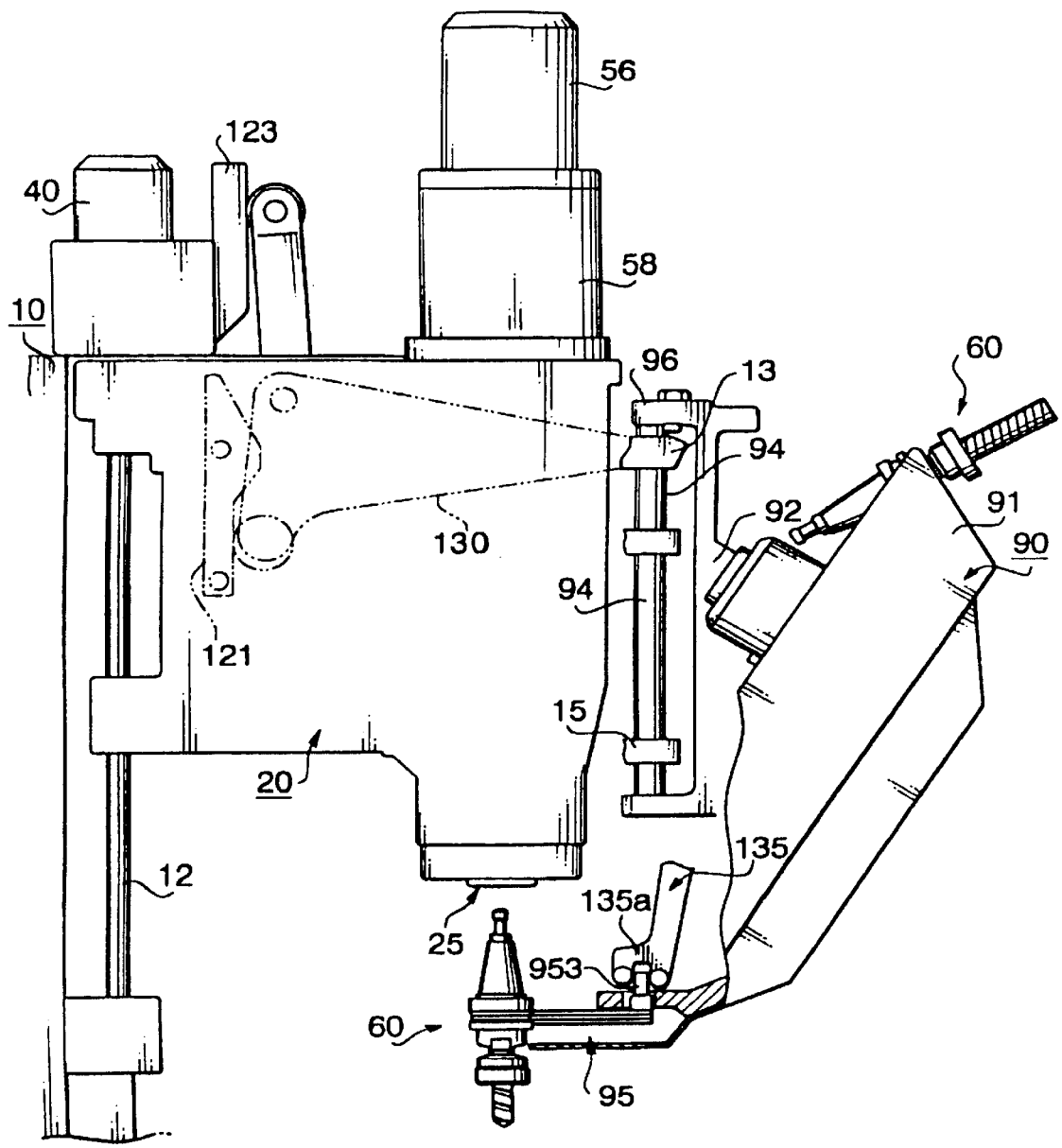
FIG. 10 is a side view of the main part of the machine tool of FIG. 3.

As the spindle head 20 further moves upward, the cam follower 132 of the bell crank 130 contacts the second surface 121b of the cam 121, so that the bell crank 130 swings clockwise. With this, the magazine 90 moves downward. In this state, the tool 60 is fully taken out from the spindle 25 as shown in FIG. 10, in such a manner that the tool 60 is held by the tool holder 95.

After the tool 60 is taken out from the spindle 25, the controller drives the magazine rotation mechanism (not shown) to rotate the bevel wheel 91, until another tool arrives beneath the spindle 25. Then, the controller drives the elevation motor 40 to move the spindle head 20 downward. When the spindle head 20 moves downward, the roller 132 contacts the second slope 121b of the cam 121. With this, the magazine 90 moves upward so that the new tool is inserted in the spindle 25. When the spindle head 20 further moves downward, the cam follower 36 of the pusher lever 30 is moves away from the cam 125. The pusher lever 30 is biased by a not shown spring counterclockwise, so that the pusher lever 30 releases the drive ring 80. With this, the draw bar 65 moves upward (due to the force of the spring 78), thereby to catch the new tool.

As described above, according to the first embodiment, it is not necessary to provide a space for the pusher lever above the pin 70. Thus, compared with a conventional clamp mechanism shown in FIG. 1, the whole length of the spindle 25 can be shortened. Accordingly, it is possible to miniaturize the machine tool 1 and to reduce the manufacturing cost thereof.

Further, since the pusher lever 30 urges the lower flange 83, the pusher lever 30 is able to push the drive ring 80 irrespective of the rotational position of the drive ring 80 (that is, irrespective of the rotational position of the spindle 25). Furthermore, since the distance between the two cutaway portions 84 of the drive ring 80 are smaller than the distance between the two contact rollers 38, the contact rollers 38 do not interfere with the drive ring 80 when the drive ring 80 is pulled out from the spindle head 20. Additionally, since the through-hole 82 of the drive ring 80 is formed on the thick-walled portion of the upper flange 81, a relatively large force can be applied to the connecting pin 70.

In the first embodiment, it is alternatively possible to fix the spindle directly to a motor shaft (or a reducer shaft) of the rotation motor 56 without providing the coupling 54. Further, it is possible to drive the pusher lever 30 by means of an exclusive driving mechanism such as an air cylinder.

Figure 11:
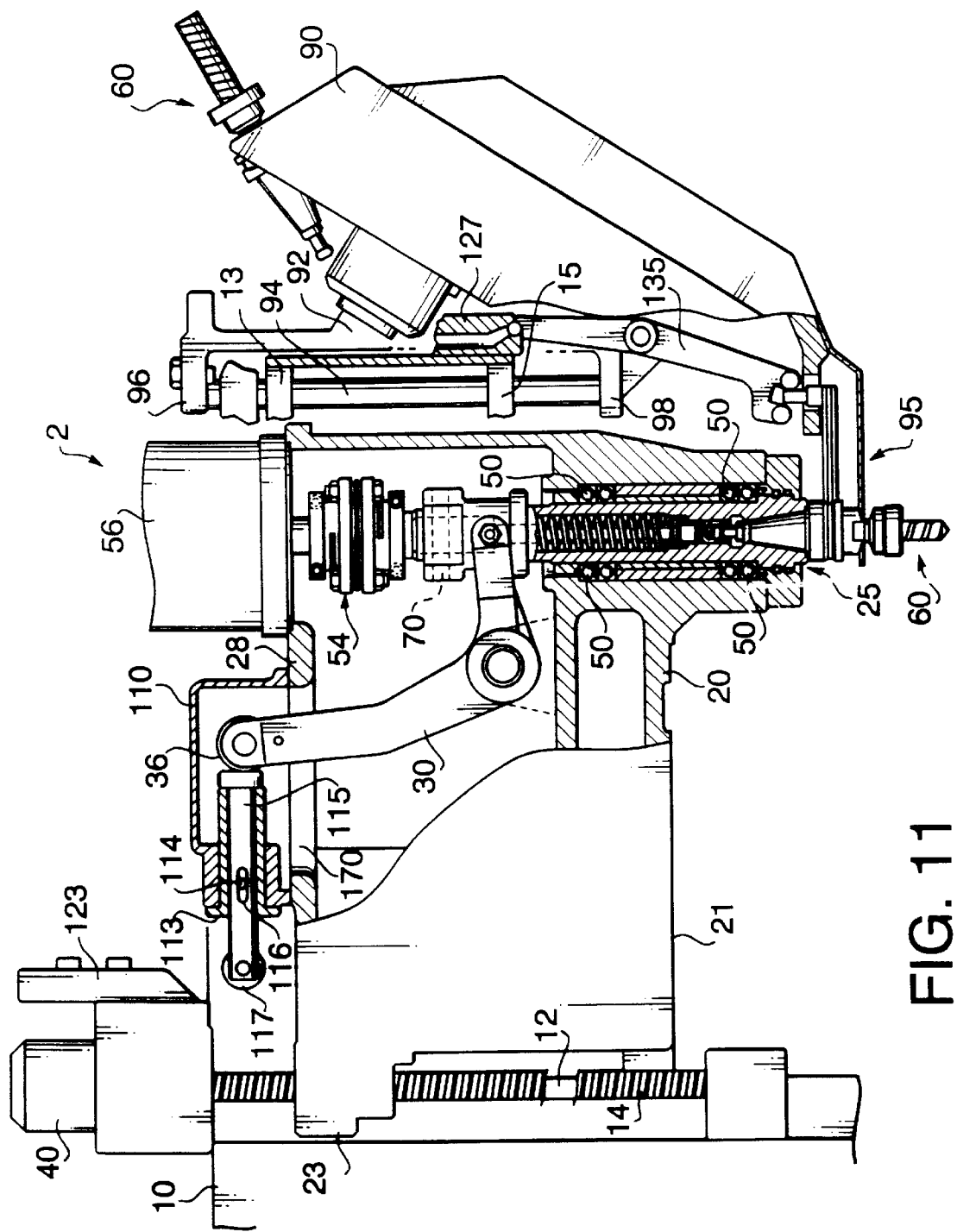
FIG. 11 is a side view of a machine tool according to a second embodiment.
Figure 12:
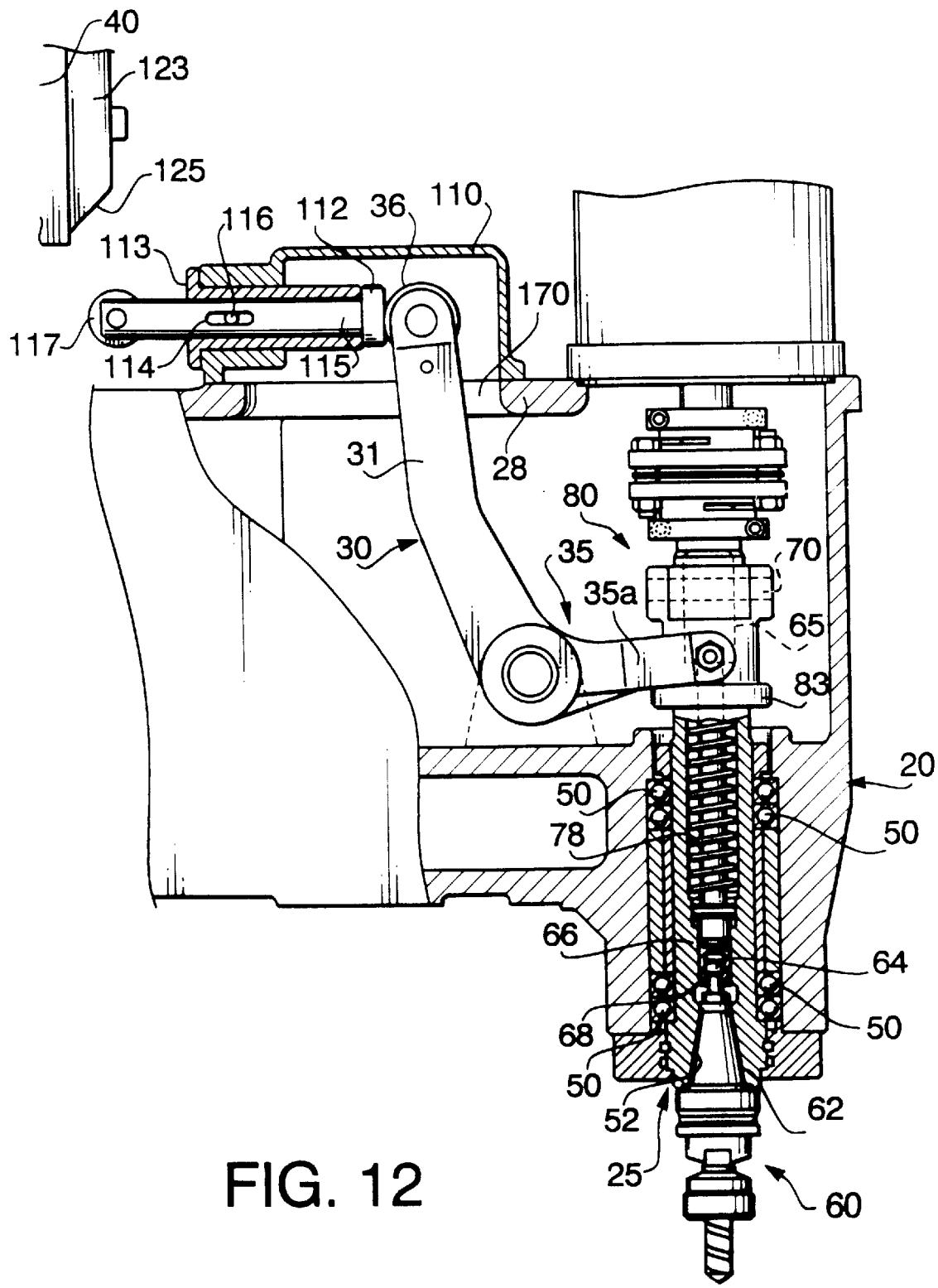
FIGS. 12 and 13 are side views of a main part of the machine tool of FIG. 11.
Figure 13:
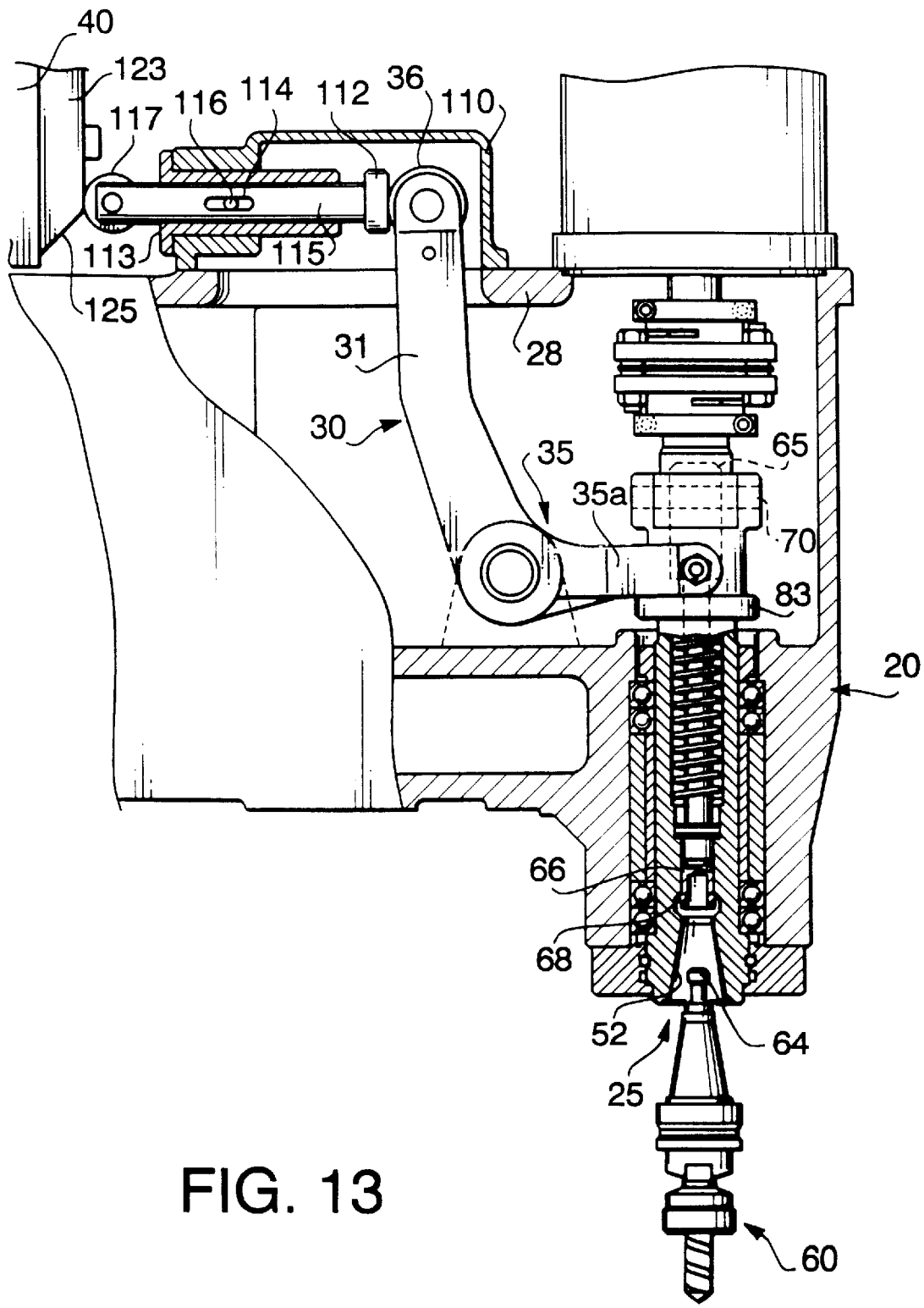

The second embodiment of the present invention is described with respect to FIGS. 11 through 13. FIG. 11 is a side view showing a machine tool 2 using a clamp mechanism according to the second embodiment. FIGS. 12 and 13 are side views showing a main part of the machine tool 2. In the second embodiment, components having the same structure as those in the first embodiment are denoted by same numbers.

In order to allow the pusher lever 30 to project upward from the spindle head 20, an opening 170 is formed on a top plate 28 of a housing 21 of the spindle head 20. The opening 170 is large enough to allow the swinging motion of the pusher lever 30. A cover 110 is provided to the housing 21, which covers the pusher lever 30 and the opening 170.

A bushing 113 is provided to a side wall of the cover 110, which horizontally penetrates the side wall of the cover 110. A rod 115 is inserted in the bushing 113 so that the rod 115 is slidable outward and inward. A slot 114 is formed on the rod 115, which is elongated in the axial direction of the rod 115. An engaging pin 116 (formed on the bushing 113) engages the slot 114, thereby to prevent the rotation of the rod 115. The rod 115 has a contact member 112 at its inner end, which abuts the cam follower 36 of the pusher lever 30. Further, the rod 115 has a cam follower 117 at the its outer end. The cam follower 117 is located beneath the cam plate 123 so that the cam follower 117 is engagable with the cam plate 125.

With such an arrangement, when the spindle head 20 moves upward, the cam follower 117 of the rod 115 engages the cam plate 123. Due to the engagement of the cam follower 117 and the cam plate 123, the rod 115 slides to the right, so as to urge the pusher lever 30 to the right. With this, the pusher lever 30 swings clockwise. Since the operation caused by the swinging of the pusher lever 30 is similar to that of the first embodiment, the description thereof is omitted.

As described above, according to the second embodiment, it is not necessary to provide a large opening on the housing of the spindle head. Further, since a clearance between the rod 115 and the bushing 113 are small, the invasion of cutting chips or cutting oil into the spindle head 20 through the clearance can be neglected. Accordingly, the invasion of cutting chips or cutting oil into the spindle head 20 can be prevented. This second embodiment is not limited to a clamp mechanism having a drive ring 80.

Figure 14:
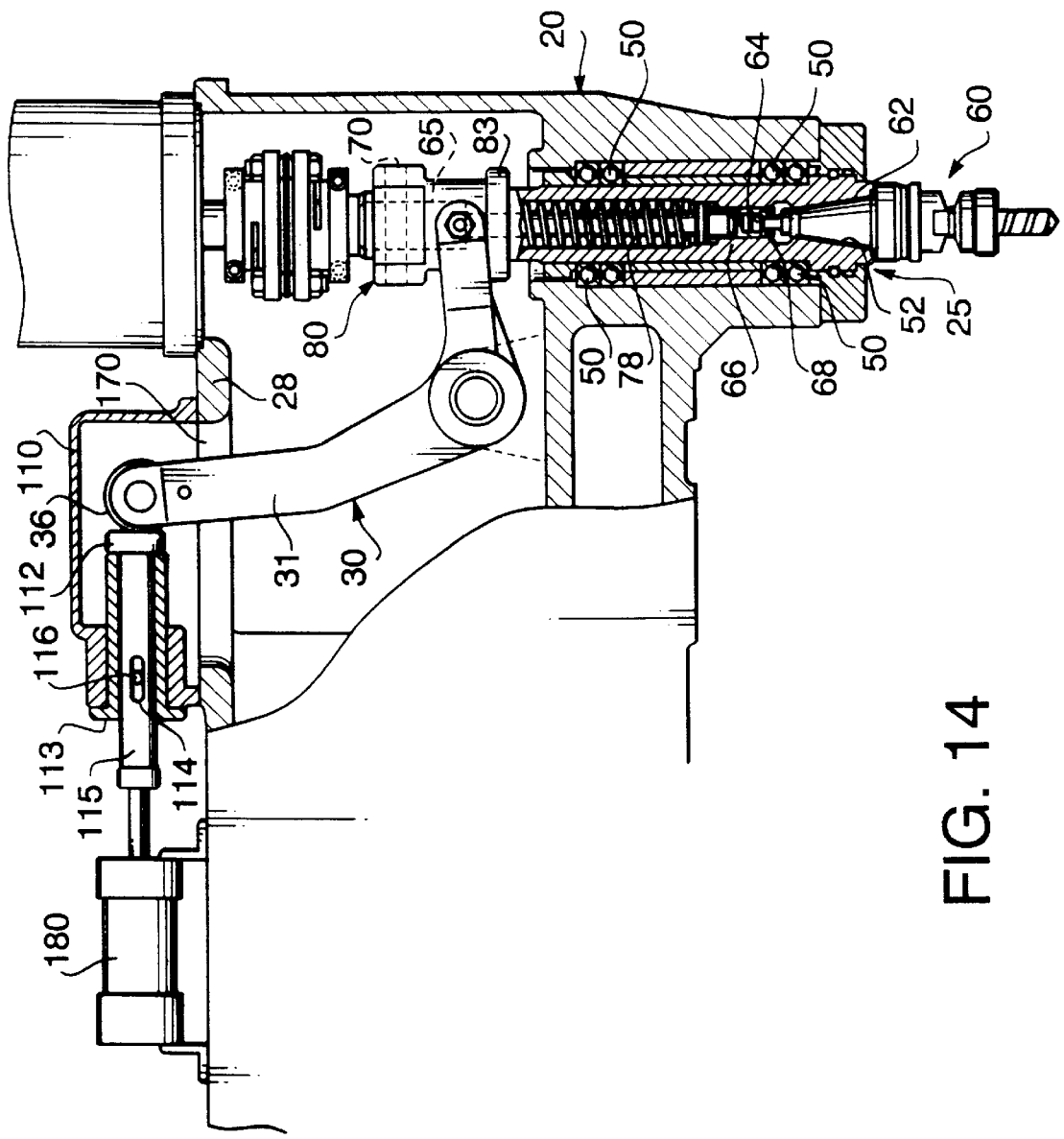
FIG. 14 is a side view of a machine tool of a modification of the second embodiment.

FIG. 14 is a side view showing a modification of the second embodiment. In this modification, the rod 115 is actuated by an air cylinder 180 provided to the top of the spindle head 20. With this, the draw bar 65 is driven individually. Such structure is advantageous when employed in a machine tool wherein a spindle head is not movable.

Although the structure and operation of a clamp mechanism is described herein with respect to the preferred embodiments, many modifications and changes can be made without departing from the spirit and scope of the invention.

In particular, the above described embodiments can be applied to a machine tool wherein a spindle is horizontally supported. Further, the above described embodiment can be applied to any type of machine tool as long as it uses a draw bar for catching/releasing the tool.

What is claimed is:

1. A tool clamp mechanism used in a machine tool, said tool clamp mechanism comprising:
    a hollow spindle in which a tool can be inserted, said spindle having at least one slot which is axially elongated;
    a draw bar provided in said spindle, said draw bar being axially movable in first and second directions to thereby release said tool and to clamp said tool, respectively;
    a biasing member provided in said spindle, which biases said draw bar in said second direction;
    a spindle head which rotatably supports said spindle;
    a drive ring provided around said spindle;
    a pusher lever provided to said spindle head, said pusher lever being provided with at least one roller which urges said drive ring in said first direction; and
    a connecting pin which connects said draw bar and said drive ring, said connecting pin penetrating said drive ring and said draw bar through said slot,
    said drive ring having a contact surface which said at least one roller of said pusher lever abuts, said contact surface being positioned ahead of said connecting pin in said first direction.

2. The tool clamp mechanism according to claim 1, wherein said drive ring includes:
    a first flange on which said contact surface is formed;
    a second flange which said connecting pin penetrates; and
    a cylinder portion between said first and second flanges.

3. The tool clamp mechanism according to claim 2, wherein said pusher lever is provided with a fork portion and wherein said at least one roller includes two rollers provided to said fork portion, which urge said contact surface of said flange.

4. The tool clamp mechanism according to claim 3, wherein said second flange has two cutaway portions which are parallel with each other,
    wherein a distance between said two cutaway portions is smaller than a distance between said two contact elements.

5. The tool clamp mechanism according to claim 4, wherein said second flange has at least one through-hole through which said connecting pin is inserted,
    said hole being formed on a thick-walled portion of said second flange.

6. A tool clamp mechanism used in a machine tool, wherein said tool clamp mechanism comprises:
    a hollow spindle in which a tool can be inserted;
    a draw bar provided in said spindle, said draw bar being axially movable in first and second directions to thereby release said tool and to clamp said tool, respectively;

a spindle head which rotatably supports said spindle, said spindle head having a housing;

a drive ring provided around said spindle;

a connecting pin that connects said draw bar and said drive ring, said connecting pin penetrating said drive ring and said draw bar through an axially extending slot formed on said spindle; and a pusher mechanism which urges said draw bar in said first direction so that said draw bar releases said tool, said pusher mechanism including a pusher lever accommodated in said housing of said spindle head, and a slidable member provided to said spindle head, a part of said slidable member being in abutting contact with said pusher lever, wherein said slidable member projects from said housing and is slidable inward and outward of said housing so that said slidable member is engagable with a drive member provided outside of said spindle housing, and said drive ring has a contact surface that said pusher lever abuts, said contact surface being positioned ahead of said connecting pin in said first direction.

7. The tool clamp mechanism according to claim 1, wherein said connecting pin penetrates one axial end of said drive ring, while said contact surface is formed at the other axial end of said drive ring.

8. The tool clamp mechanism according to claim 1, wherein said pusher lever is driven by a movement of said spindle head.

9. The tool clamp mechanism according to claim 8, wherein an end of said pusher lever projects from a housing of said spindle head so that said pusher lever is engagable with a cam provided to a stationary part of said machine tool.

10. The tool clamp mechanism according to claim 8, wherein said pusher lever is fully accommodated in a housing of said spindle head, and wherein a slidable member is provided to said spindle head, one end of said slidable member being in abutting contact with said pusher lever, the other end of said slidable member projecting from said housing so that said slidable member is engagable with a cam provided to a stationary part of said machine tool.

11. The tool clamp mechanism according to claim 1, wherein said pusher lever is driven by an actuator individually.

12. A tool clamp mechanism used in a machine tool, wherein said tool clamp mechanism comprises:

a hollow spindle in which a tool can be inserted;

a draw bar provided in said spindle, said draw bar being axially movable in first and second directions to thereby release said tool and to clamp said tool, respectively;

a spindle head which rotatably supports said spindle, said spindle head having a housing and a housing cover that protect the spindle head from invasion of external cutting chips or cutting oil; and a pusher mechanism which urges said draw bar in said first direction so that said draw bar releases said tool, said pusher mechanism including a pusher lever accommodated fully accommodated in said housing of said spindle head, and a slidable member provided to said spindle head, a part of said slidable member being in abutting contact with said pusher lever, said slidable member projecting from said housing and being slidable inward and outward of said housing so that said slidable member is engagable with a drive member provided outside of said spindle housing, said slidable member sliding with only a small clearance between said housing and said slidable member so that the invasion of cutting chips or cutting oil into the housing is negligible.

13. The tool clamp mechanism according to claim 12, wherein said slidable member comprises a rod, wherein said rod is slidably supported in a through-hole provided to said housing.

14. The tool clamp mechanism according to claim 12, wherein said drive member comprising a cam provided to a stationary part of said machine tool, wherein said slidable member engages said cam according to a movement of said spindle head.

15. The tool clamp mechanism according to claim 12, wherein said drive member comprising an actuator provided to the outer surface of said housing.

16. The tool clamp mechanism according to claim 15, wherein said actuator is a fluid cylinder.

17. The tool clamp mechanism according to claim 15, further comprising:

a drive ring provided around said spindle; and a connecting pin which connects said draw bar and said drive ring, said connecting pin penetrating said drive ring and said draw bar through an axially extending slot formed on said spindle, said drive ring having a contact surface which said pusher lever abuts, said contact surface being positioned ahead of said connecting pin in said first direction.

18. The tool clamp mechanism according to claim 17, wherein said pusher lever including:

a fork portion; and two contact elements provided to said fork portion, which urge said surface of said flange.

19. A tool clamp mechanism used in a machine tool, said tool clamp mechanism comprising:

a hollow spindle in which a tool can be inserted, said spindle having at least one slot which is axially elongated;

a draw bar provided in said spindle, said draw bar being axially movable in first and second directions to thereby release said tool and to clamp said tool, respectively;

a biasing member provided in said spindle, which biases said draw bar in said second direction;

a spindle head which rotatably supports said spindle;

a drive ring provided around said spindle;

a pusher lever provided to said spindle head, which urges said drive ring in said first direction, said pusher lever being driven by a movement of said spindle head; and a connecting pin which connects said draw bar and said drive ring, said connecting pin penetrating said drive ring and said draw bar through said slot, wherein said pusher lever is fully accommodated in a housing of said spindle head and a slidable member is provided to said spindle head, one end of said slidable member being in abutting contact with said pusher lever, the other end of said slidable member projecting from said housing so that said slidable member is engagable with a cam provided to a stationary part of said machine tool.

20. A tool clamp mechanism used in a machine tool, said tool clamp mechanism comprising:

a hollow spindle in which a tool can be inserted, said spindle having at least one slot which is axially elongated;

a draw bar provided in said spindle, said draw bar being axially movable in first and second directions to thereby release said tool and to clamp said tool, respectively;

a biasing member provided in said spindle, which biases said draw bar in said second direction;

a spindle head which rotatably supports said spindle;

a drive ring provided around said spindle;

a pusher lever provided to said spindle head, which urges said drive ring in said first direction, said pusher lever being provided with two contact elements; and a connecting pin which connects said draw bar and said drive ring, said connecting pin penetrating said drive ring and said draw bar through said slot, said drive ring having a first flange on which a contact surface is formed and on which said pusher lever abuts, said contact surface being positioned ahead of said connecting pin in said first direction, said drive ring also having a second flange which said connecting pin penetrates, said second flange having two cutaway portions that are parallel with each other, wherein a distance between said two cutaway portions is smaller than a distance between said two contact elements.

* * * * *